United States Patent [19]
Christensen et al.

[11] Patent Number: 4,955,194
[45] Date of Patent: Sep. 11, 1990

[54] DAMPING ARRANGEMENT FOR DAMPING THE OSCILLATIONS OF VALVE CONTROLLED BY PRESSURE FLUID

[75] Inventors: Thorkild Christensen, Sonderborg; Svend E. Thomsen, Nordborg, both of Denmark; Siegfried Zenker, Kirchseeon, Fed. Rep. of Germany

[73] Assignees: Danfoss A/S, Nordborg, Denmark; Danfoss A/S, Nordborg, Denmark

[21] Appl. No.: 418,969

[22] Filed: Oct. 10, 1989

Related U.S. Application Data

[63] Continuation of Ser. No. 248,924, abandoned.

[30] Foreign Application Priority Data

Oct. 6, 1987 [DE] Fed. Rep. of Germany ....... 3733740

[51] Int. Cl.⁵ ..................... F16D 31/06; G05D 23/00
[52] U.S. Cl. ..................... 60/329; 236/93 R
[58] Field of Search .......... 60/329, 452, 459; 236/93 R, 102

[56] References Cited

U.S. PATENT DOCUMENTS

| | | | |
|---|---|---|---|
| 593,399 | 11/1897 | Leitch | 236/102 X |
| 1,964,638 | 6/1934 | Kreidel | 236/93 R X |
| 2,966,170 | 12/1960 | Raulins | 236/93 R X |
| 3,340,893 | 9/1967 | Lockwood | 236/93 R X |
| 3,971,216 | 7/1976 | Miller | 60/452 X |
| 4,266,464 | 5/1981 | Baatrup et al. | |
| 4,401,009 | 8/1983 | Zeuner et al. | 60/452 X |
| 4,426,194 | 1/1984 | Pollman | 60/329 X |
| 4,523,430 | 6/1985 | Masuda | 60/452 X |
| 4,685,295 | 8/1987 | Christiansen et al. | 60/459 |

FOREIGN PATENT DOCUMENTS 865413  2/1953  Fed. Rep. of Germany ........ 60/329

Primary Examiner—Stephen M. Hepperle
Attorney, Agent, or Firm—Wayne B. Easton; Clayton R. Johnson; Wayne B. Easton

[57] ABSTRACT

A damping arrangement for damping the oscillations of valves which are controlled by pressure fluid and the control pressure conduits of which contain a throttle. A characteristic is that initial oscillations can be rapidly stabilized independently of the operating temperature of the pressure fluid. This is accomplished by the throttle having a throttle gap of which the height varies oppositely to the temperature of the pressure fluid so as to compensate fully or partially for changes in the hydraulic resistance that are occasioned by the temperature. The throttle gap is mostly traversed by laminar flow and consequently there is a high hydraulic throttling resistance even at low speeds of flow. The throttle is therefore also adapted effectively to damp small oscillations of the valve element so that the initial oscillations are rapidly stabilized.

6 Claims, 4 Drawing Sheets

DAMPING ARRANGEMENT FOR DAMPING THE OSCILLATIONS OF VALVE CONTROLLED BY PRESSURE FLUID

This application is a continuation of U.S. Ser. No. 248,924, now abandoned.

The invention relates to a damping arrangement for damping the oscillations of valves which are controlled by pressure fluid and the control pressure conduits of which contain a throttle.

Such a damping arrangement is, for example, known from U.S. Pat. No. 4,266,464. This discloses a plurality of slide valves of which the control pressure is derived from the pressure of the system that, in turn, is influenced by the controlled valve. The throttles in the connecting conduits for the control pressure chambers are intended to ensure that oscillatory movements of the valve slides are substantially damped and particularly the initial oscillations occurring during pressure changes are stabilised.

It will be known that the viscosity of a pressure fluid changes with temperature. For this reason, in a pressure setting valve with manual actuation and return of the said pressure by way of a fixed throttle in a control pressure chamber, one has made provision for an additional load on the valve slide by a bimetallic strip which is in contact with the pressure medium (U.S.-PS 2 965 120). However, this has no influence on the damping of the oscillations.

Damping of oscillations independent of the temperature of the pressure fluid, and therefore independently of its temperature, is achieved if the throttles are in the form of sharp-edged diaphragms, such as apertured diaphragms. Unfortunately, with a weak flow, these exert practically no hydraulic resistance so that they will not do any damping of small oscillations. The initial oscillations will therefore take comparatively long.

A throttle designed for laminar flow is known (U.S.-PS 3 144 879) in which an annular throttle gap is formed between two adjacent end faces. The inner rim and the outer rim of one end face are each connected to a pressure medium connection by way of a bore of small diameter. The gap height of the throttle gap is adjustable by hand or depending on the temperature. In the last mentioned case, one end face is screw-connected to a rod and the other end face is secured to a sleeve. The rod and sleeve are tightly interconnected at the other end. The sleeve has a higher coefficient of thermal expansion than the rod. This construction can be employed for remote measurement of the temperature by measuring the flow resistance.

It is the object of the invention to provide a damping arrangement of the aforementioned kind with which the initial oscillations can be rapidly stabilised independently of the operating temperature of the pressure fluid.

According to the invention, this problem is solved in that the throttle has a throttle gap of which the height varies oppositely to the temperature of the pressure fluid so as to compensate fully or partially changes in the hydraulic resistance that are occasioned by the temperature.

The throttle gap is for the most part traversed by laminar flow. Consequently, there is a high hydraulic throttling resistance even at low speeds of flow. The throttle is therefore also adapted effectively to damp small oscillations of the valve element, e.g., a valve slide, so that the initial oscillations are rapidly stabilised.

The hydraulic resistance of a throttle gap having a fixed height is unusually intensively influenced by the temperature-dependent viscosity of the pressure fluid. Since the height of the gap is made compensatingly dependent on the temperature of the pressure fluid, it is possible to maintain the hydraulic resistance fully or partially even with temperature changes. The hydraulic resistance of the throttle determined and then set to give good damping is therefore just as effective when the hydraulic system is operated while the pressure fluid is still cold as when the pressure fluid has been considerably heated in the pump or in some other way.

It is particularly favourable if the height of the gap is constant over the length of the throttle gap. The simplest way of achieving this is with planar and parallel interfaces. However, gaps having a slightly variable height, such as when formed by the immersion of a conical shaft in a cylindrical bore, can also be used.

With particular advantage, the substantially rectilinear characteristic graph of the gap height against the temperature is chosen so that, in the temperature operating range, it twice intersects the curve corresponding to the accurate maintenance of the hydraulic resistance. In this way one obtains a truly accurate temperature compensation.

A still better result is achieved if a further throttle gap with a different temperature dependence or constant gap height is connected in parallel to the first throttle gap. This leads to combined characteristic lines which can be still more accurately adapted to the curve corresponding to a constant hydraulic resistance.

In particular, the substantially rectilinear characteristic graphs of the heights of both gaps against the temperature can be selected so that, in the temperature operating range, they intersect the curve corresponding to the accurate maintenance of the hydraulic resistance at least three times.

From a constructional point of view, it is advisable for a rod to be arranged with play in a housing, to have a higher coefficient of thermal expansion than the housing, and to be connected to the housing at one end, the throttle gap being formed at the other end between two end faces of which one is connected to the rod and the other to the housing, one of the pressure fluid connections being provided in the region of the middle of the end face and the other pressure fluid connection being connected to the rim of the end face. The height of the gap varies depending on the difference of the two coefficients of thermal expansion. By selecting the initial gap height and the materials for the rod and housing, one can achieve the desired characteristic graph.

Preferably, the throttle gap is formed between the end face of the rod and the end face of the housing base which is provided with a central hole as the pressure fluid connection. This central hole defines the inner boundary of the throttle gap and has such a large cross-section that it will not become blocked by particles of dirt and the like. In addition, the construction is very simple.

The other pressure fluid connection is preferably formed by at least one transverse bore in the housing wall and connected to the rim of the end face by way of the play (annular clearance) between the rod and housing. This gives a very simple construction taking up little space. Another advantage is that the pressure fluid makes contact with the rod as well as the housing over a certain length so that these parts assume the temperature of the pressure fluid.

The parallel second throttle gap may be formed by a radial groove in at least one of the end faces. This increases the expense by only a little.

In one embodiment, the base of the housing is placed on a sleeve-like housing, preferably by means of a press fit. In this case, the other end of the sleeve can be closed and receive the rod in a fixed position. By appropriately placing the base of the housing over the housing, the height of the throttle gap can be accurately set.

In another embodiment, the rod is screw-connected to the housing. In this case, the base of the housing may be made in one piece with the rest of the housing. However, it is particularly important that the basic position of the gap height should be variable by turning the rod in its screw connection.

It is particularly recommended for the housing to be a sleeve-like screw element which is screwed into a bore of a valve block, the bore being provided with connecting passages, wherein the valve block carries at each of its base and intermediate its length a pressure fluid connection connected to a respective connecting passage and is surrounded by its annular seal between the pressure fluid connections. Such a screw element can be rationally produced in large numbers and subsequently inserted in the valve block.

In a further embodiment, the rod has a bypass passage provided with a check valve. One can in this way obtain damping conditions in one flow direction different from those in the other flow direction. Preferred examples of the invention will now be described in more detail with reference to the drawing, wherein.

Figure 1:
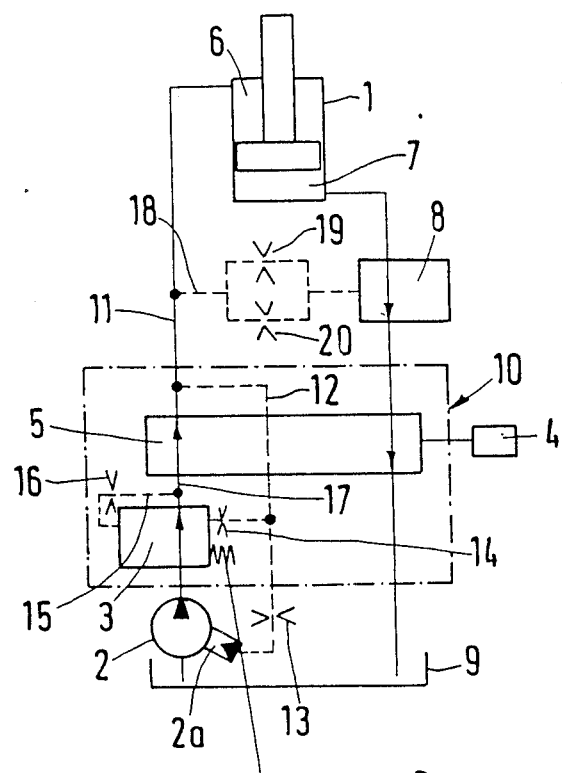
FIG. 1 is a diagrammatic representation of a hydraulic system having a plurality of damping arrangements according to the invention, the circuitry showing only the charging one of the motor chambers.

FIG. 1 illustrates a hydraulic system for actuating a servo motor 1. An adjustable pump 2 conveys pressure fluid by way of a compensating valve 3 and a conventional main control valve 5 adjustable by means of a manual actuating element 4 or the like to the pressure chamber 6 of the servo motor 1, whilst pressure fluid returns to the container 9 from the pressure chamber 7 by way of a conventional load reducing valve 8 (details not being shown) and the main control valve 5. The main control valve 5, together with a compensating valve 3 forms a proportional valve 10. The pressure in the motor supply conduit 11 is fed by way of a control pressure conduit 12 and a first throttle 13 to the adjusting device 2a of the pump 2. The latter ensures that the pump pressure is always above the pressure in the motor supply conduit 11 by a predetermined amount. By way of a second throttle 14, the pressure in the control pressure conduit 12 is supplied to the compensating valve 3 which is loaded in the opposite direction by way of a control pressure conduit 15 with a throttle 16 by the pressure obtaining in the conduit 17 between the compensating valve 3 and the main control valve 5. Working in the same sense as the control pressure there is a spring 17a so that the compensating valve 3 holds the pressure drop at the main control valve 5 constant. A further control pressure conduit 8 connects the motor supply conduit 11 by way of the parallel connection of two throttles 19 and 20 to the load reducing valve 8 which, as is known, is also provided with other control pressure connections (not shown). The circuitry in FIG. 1 only shows the pressure chamber 6 being charged, the manner of pressurizing chamber 7 being conventional other than for incorporating the damping provided by the present invention.

Upon adjusting the main control valve 5, changes occur in the pressure conditions of the motor supply conduit 11 and consequently the control pressure conduits 12 and 18. This has an influence on the adjusting apparatus 2a of the pump 2, on the compensating valve 3 and on the load reducing valve 8. The illustrated throttles 13, 14, 16, 19, 20 prevent the movable parts of the individual valves from oscillating or ensure that they assume a new stable condition after a short period. The effectiveness of the individual throttles depends on their hydraulic resistance.

Figure 2:
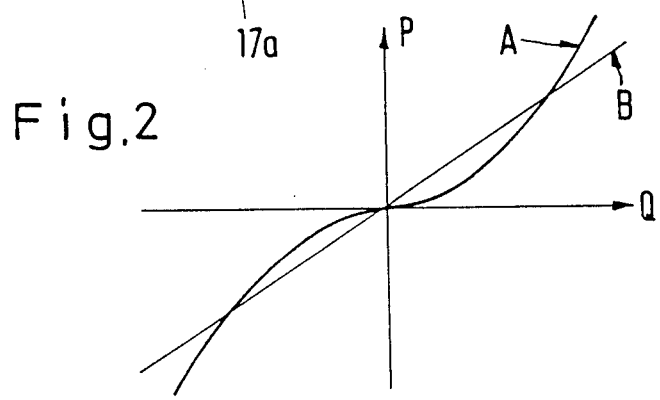
FIG. 2 is a pressure-flow diagram showing the characteristic lines of different throttles.

The hydraulic resistance is defined as $K = \Delta p/Q$ wherein $\Delta p$ is the pressure drop at the throttle and Q the flow per unit time. FIG. 2 shows the characteristic lines in a Q-p diagram for different types of throttles. The line A is for an apertured diaphragm or a different diaphragm operating with a sharp edge. The characteristic line shows that the hydraulic resistance near zero flow is exceptionally small and rises only at higher amounts of flow. The straight line B belongs to a throttle operating with substantially laminar flow. Such a throttle has a substantially constant hydraulic resistance over the entire range of flow.

Figure 3:
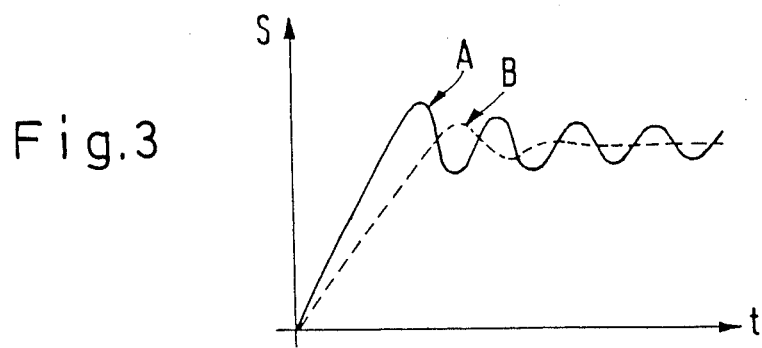
FIG. 3 is a position-time diagram showing the initial oscillations.

In FIG. 3, the valve slide position s is plotted against time t after a sudden change in pressure. The curve A again shows the conditions with a sharp-edged diaphragm. Initially, there is good damping. With smaller oscillations and thus less fluid displacement, the damping is inadequate. The initial oscillations are stabilised only very gradually. Curve B indicates the conditions when using a throttle with laminar flow. Stable initial oscillations are achieved after a short time. It should be noted, however, that the sharp-edged diaphragm of curve A depends on the temperature whereas the rectilinear line B considerably depends on the viscosity of the pressure fluid and consequently its temperature.

Figure 4:
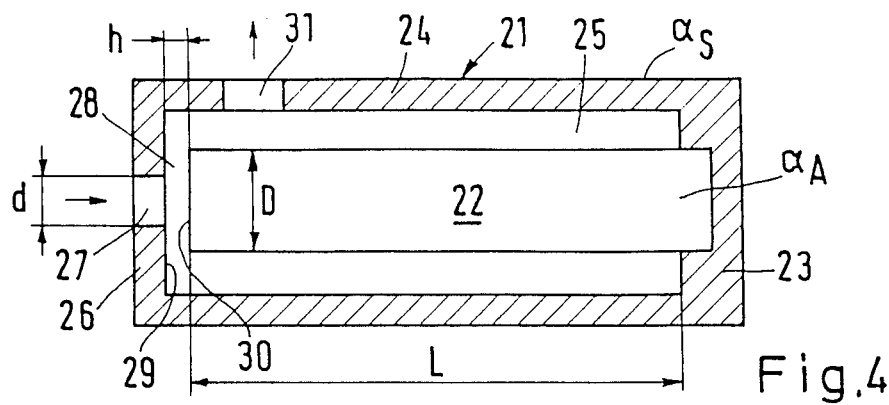
FIG. 4 is a diagrammatic longitudinal section of one embodiment of the invention.

To solve this problem, a damping arrangement 21 is proposed in the manner shown in principle in FIG. 4. A rod 22 having a free length C and a diameter D is connected at one end to the end wall 23 of a sleeve-like housing 24 so that play (annular clearance space) 25 remains between the bore of the housing and the rod. The housing 21 is provided with a base 26. This has a central hole 27 of diameter d serving as a pressure fluid connection. Consequently, an annular throttle gap 28 of a height h is formed between the end face 29 of the housing base and the end face 30 of rod 22. Further, a further pressure fluid connection 31 is provided in the side wall of the sleeve-like housing 24. The coefficient $\alpha_A$ of thermal expansion of the rod is larger than the coefficient $\alpha_S$ of thermal expansion of the housing 24. For example, the rod may be of aluminium or plastics and the housing of steel.

With reference to the equations set forth below, the terminology "length of faces" and "L" refers to the distance that oil has to travel between two parallel end faces while D is the width of the oil flow closed channel with a low ceiling or spacing between the faces so that laminar flow is obtained. In equation 2, "L" is equal to half of the difference between the two diameters (capital "D" and small "d"), i.e. that is "L" is equivalent to the radial distance that the oil has to travel in FIG. 4. The width of the faces is equal to the circumference of the hole 27 that is designated small "d".

It will be known that, for ideal laminar throttling between two planar and parallel faces, there is the following relationship between the flow Q and the pressure drop $\Delta p$:

$$Q = \frac{1}{12} \cdot \frac{h^3 \cdot b}{L \cdot \rho \cdot \gamma(t)} \cdot \Delta p$$

wherein,
h = spacing between the faces
b = cross-sectional width
L = length of the faces
$\rho$ = density of the oil
$\gamma$ = viscosity of the oil The equation $$\frac{\Delta p}{Q} = \frac{12 \cdot L \cdot \rho \cdot \gamma(t)}{h^3 \cdot b} = K \quad (1)$$

is termed the hydraulic resistance which, through the viscosity, is necessarily dependent on temperature.

If this equation is applied to the example of FIG. 4, then, taking the temperature dependence into account, one obtains the equation:

$$\frac{12 \cdot \frac{D-d}{2} \cdot \rho \cdot \gamma(t)}{(h_o - d \cdot C \cdot t)^3 \cdot \pi \cdot d} = K \quad (2)$$

where $d = d_A - d_S$ is the difference between the two temperature coefficients of the rod and housing.

Figure 5:
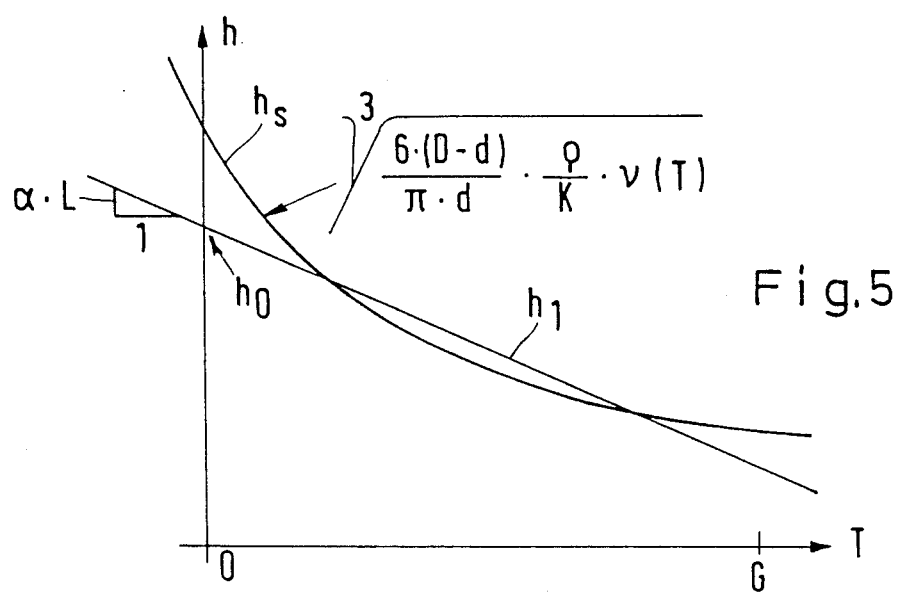
FIG. 5 is a gap height-temperature diagram with different characteristic lines.

If one transposes Equation (2) as follows:

$$h_o - d \cdot C \cdot t = \sqrt[3]{\frac{6(D-d)}{\pi \cdot d} \cdot \frac{\rho}{K} \cdot \gamma(t)} \quad (3)$$

then one obtains the temperature-compensated gap height h at the left and an expression for the gap height resulting from the construction and oil data for a constant hydrualic resistance at the right. Since the conditions on the left hand side of the equation change only linearly, a gap height-temperature diagram will be a straight line whereas the righthand side represents a curve depending on the cube root of the viscosity. Both curves can be adapted to each other in a manner sufficient for practical operation, as is shown in the diagram of FIG. 5. The curve $h_s$ corresponds to the righthand side, that is to say that gap height at which the hydraulic resistance $K = \Delta p/Q$ is held constant over the entire temperature range. The rectilinear characteristic line $h_1$ corresponds to the actual gap height h obtained when the rod 22 and housing 24 have assumed the temperature of the flowing fluid as a result of making contact therewith. The gap height continuously drops from the value $h_o$ obtained at a reference temperature, for example, 0° C. The operating range goes up to the limiting value G. Within this operating range O to G, the characteristic line $h_1$ is such that it intersects the characteristic line $h_s$ at two points.

In an example, the adaptation was carried out in the following manner:

| | |
|---|---|
| Desired hydraulic resistance | $K = 6$ bar/0.5 cm$^3$/sec |
| Given type of oil | $\rho = 800$ kg/m$^3$ |
| | $\gamma(20°$ O.$) = 80$ cSt |
| | $\gamma(70°$ C.$) = 10$ cSt |
| Selected rod diameter | $D = 3$mm |
| Selected hole diameter | $d = 2$mm |
| Selected coefficient of thermal expansion | $\alpha_S$(Steel) $= 11.10^{-6} \frac{1}{°C.}$ |
| Selected coefficient of thermal expansion | $\alpha_A$(Aluminium) $= 23.10^{-6} \frac{1}{°C.}$ |
| This gives: | |
| $h_o = 44$ μm; $L = 30$mm | |

One can therefore produce any desired characteristic lines by selecting the base height $h_o$, the length and the material.

Figure 6:
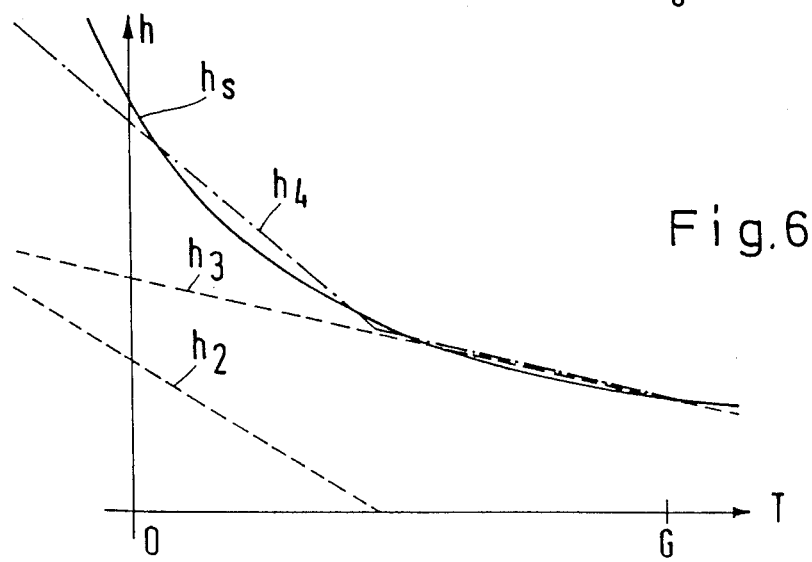
FIG. 6 is a modification of the FIG. 5 diagram.

According to FIG. 6, one can achieve a still better adaptation if throttle gaps are arranged parallel to each other as is shown for the throttles 19 and 20 in FIG. 1. Both throttle gaps have different straight characteristic lines $h_2$ and $h_3$. In the parallel connection, their curve of summation $h_4$ is effective. This curve of summation is such that it intersects the desired height $h_s$ three times in the operating range.

Figure 7:
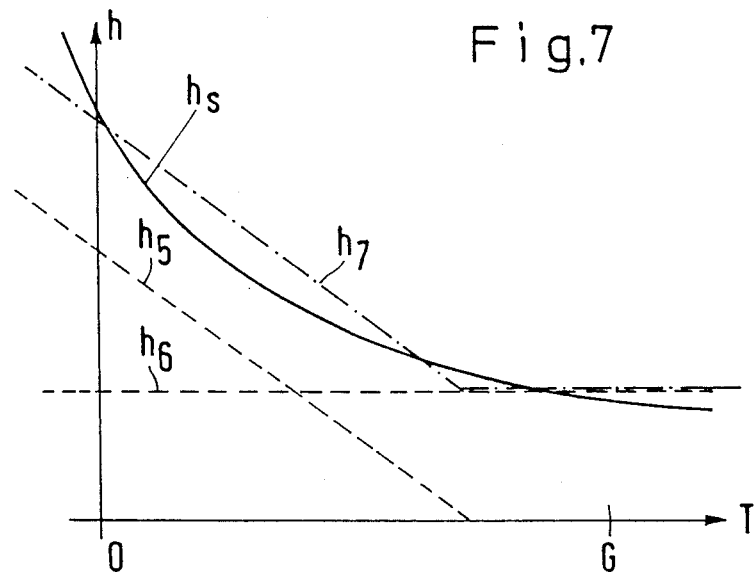
FIG. 7 is a modification of the FIG. 5 diagram.

A somewhat simpler modification is shown in FIG. 7 where a temperature-dependent characteristic line $h_5$ and a temperature-dependent characteristic line $h_6$ are in parallel to give a summation curve $h_7$. This again can be adapted to the desired curve $h_s$ so that in the operating range there are three points of intersection between O and G.

Figure 8:
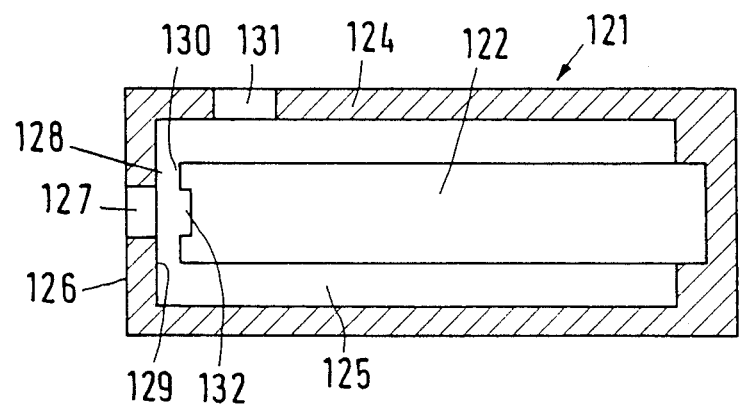
FIG. 8 is a diagrammatic representation of a further embodiment.

In FIG. 8, corresponding parts are given reference numerals increased by 100. The damping arrangement 121 of FIG. 8 differs from that of FIG. 4 only in that a diagonally extending radial groove 132 is provided in the end face 130 of rod 132. This is shown in the drawing to a much exaggerated extent. It results in two parallel throttles of different base heights but synchronised temperature dependencies. If the gap 128 formed between the end faces 129 and 130 is very small in relation to the gap formed with the aid of the groove 132, one obtains similar conditions to those shown in FIG. 7.

Figure 9:
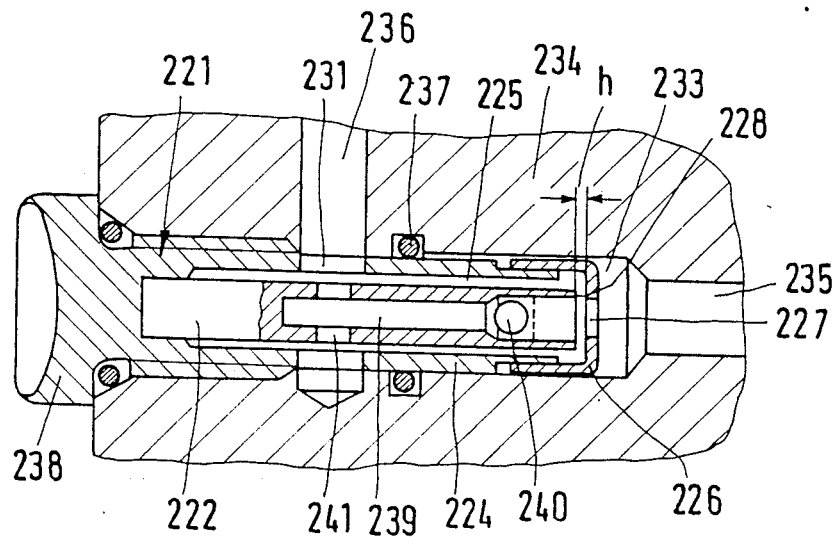
FIG. 9 is a longitudinal section of a practical example.

FIG. 9, in which reference numerals are employed which are increased by 200, shows a practical embodiment in which a damping arrangement 221 is inserted in a bore 233 of a valve block 234, the bore having a connecting passage 235 at the end and a connecting passage 236 at the periphery and, between same, an annular groove with a seal 237. The damping arrangement 221 is formed by a housing 224 in the form of a sleeve-like screw element with a head 238 to which the rod 222 is secured. A housing base 226 with a central hole 227 is press fitted thereon such that a defined gap height h is produced for the throttle gap 228. Pressure fluid therefore enters through the central hole 227, flows through the annular gap throttle 228 and, through the play 225, reaches the connecting orifice 231 which communicates with the bore 236.

In addition, the rod 222 contains an axial passage 239 with a check valve 240. With the aid of transverse bores 241, the throttle gap 228 can be bridged during each return flow.

Figure 10:
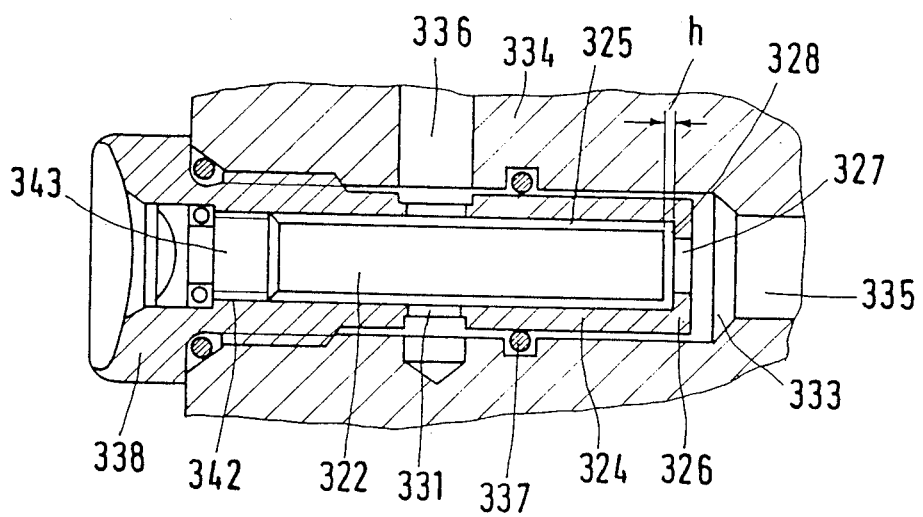
FIG. 10 is a longitudinal section of a second practical embodiment.

In the FIG. 10 embodiment, the reference numerals for corresponding parts are increased by a further 100. In this embodiment, the housing base 326 is made in one piece with the housing 324 which is again a sleeve-like screw element. The head 338 has a screwthreaded hole 342 in which a screwthreaded head 343 of the rod 322 is inserted. Consequently, the basic setting of the gap height h can be selected by turning the rod 322.

Other embodiments are conceivable, for example a cylindrical gap with a height that changes with temperature. One can also have a rod with a conical end entering a cylindrical bore and in this way altering the cross-section of the gap.

The illustrated damping arrangement is suitable for any desired hydraulic systems, particularly for proportional valves in mobile hydraulics but also for load holding valves, quantity regulators, priority valves and many other devices. In particular, such oscillation and damping is of advantage when variable hydraulic machines such as cranes, lifting platforms etc. are to be operated or when oscillations could arise through external influences such as an oscillating load.

We claim:

1. A damping arrangement for damping oscillations in operable mechanism that includes a source of pressurized fluid, a fluid operated motor, a supply line for connecting the source to the fluid operated motor, at least one pressure controlled valve connected in the supply line that has a control pressure input port and a control pressure output port, a main valve connected in the supply line downstream of the pressure controlled valve, a first pressure control line connected between the input port and supply line, and a second pressure control line connected between the output port and supply line, comprising throttle means in at least one of the control lines for at least partially eliminating hydraulic resistance changes resulting from temperature changes damping oscillations of valves, the throttle means including a housing having a first end portion, an axially opposite second end portion defining an interior end face, and an intermediate sleeve portion extending between the housing end portions and having annular wall means defining an axially elongated bore that opens to the housing end face and to the first end portion, the first end portion being joined to the sleeve portion axially opposite the housing end face to form a sleeve portion closure, the housing second end portion having a central holes that provides an inlet port opening through the housing end face to the bore to provide a first fluid connection to the respective control line, the housing end face being planar radially from the wall means to the hole, and an axial elongated rod located in the bore to provide an annular clearance space from the rod to the wall means that is structurally free from the housing first portion to the housing end face, the rod having a first end portion mounted in fixed relationship to the housing first end portion and a second end portion defining an end face axially spaced from the housing end face by a gap height h to provide an annular throttle gap, the housing intermediate portion having an output port to provide a second pressure connection to the respective control pressure line and opening to the clearance space, the housing and rod being made of materials having different coefficients of expansion to vary h oppositely of the variation of the temperature of the pressurized fluid to at least partially compensate for changes in temperature, the length of the faces, the height h and the rod and housing materials are selected so that the rectilinear characteristic graph $h_1$ of the gap height against temperature in the temperature operating range twice intersects a corresponding curve $h_s$ for a constant hydraulic resistance.

2. The damping arrangement according to claim 1, characterized in that the rod end face is parallel to the housing end face to provide a gap height that is constant over the length of the throttle gap.

3. The damping arrangement according to claim 1, characterized in that at least one of the end faces has a radial groove to form a second throttle gap.

4. The damping arrangement according to claim 1, characterized in that the rod and housing have cooperating threads that mount the rod to the housing.

5. The damping arrangement according to claim 1, characterized in that there is provided a valve block having an axial block bore that has a threaded first end portion, an axial intermediate portion, and a second end portion, a pressure fluid connection opening to the block bore intermediate portion and a second pressure fluid connection opening to the block bore second end portion, the housing extending within the block bore, having its first end portion threaded into the block threaded portion and the hole opening to the block bore second end portion, and a fluid seal radially between the housing and valve block and axially between the second fluid connections and the first fluid connections.

6. The apparatus of claim 1, further characterized in that the source of fluid has adjusting mechanism, that the pressure controlled valve is a compensating valve, that one of the first and second control lines is connected to the supply line between the compensating valve and the main valve and that the other of the first and second control lines includes a first line portion connected to the supply line downstream of the main valve and to the adjustment mechanism and a second line portion connecting the first line portion to the compensating valve, that the above throttle means is provided in the first control line and that there is provided second throttle means in the second line portion that is the same as said above throttle means.

* * * * *